US012684453B2

(12) United States Patent
Zhao et al.

(10) Patent No.: US 12,684,453 B2
(45) Date of Patent: Jul. 14, 2026

(54) ACTIVITY PATTERN OF COVERAGE ENHANCING DEVICES

(71) Applicant: Sony Group Corporation, Tokyo (JP)

(72) Inventors: Kun Zhao, Malmö (SE); Jose Flordelis, Lund (SE); Olof Zander, Södra Sandby (SE); Fredrik Rusek, Eslöv (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 310 days.

(21) Appl. No.: 18/288,363

(22) PCT Filed: May 5, 2022

(86) PCT No.: PCT/EP2022/062179
§ 371 (c)(1),
(2) Date: Oct. 25, 2023

(87) PCT Pub. No.: WO2022/234028
PCT Pub. Date: Nov. 10, 2022

(65) Prior Publication Data
US 2024/0205791 A1 Jun. 20, 2024

(30) Foreign Application Priority Data
May 7, 2021 (SE) .................................... 2150583-9

(51) Int. Cl.
*H04W 40/22* (2009.01)
(52) U.S. Cl.
CPC .................................. *H04W 40/22* (2013.01)
(58) Field of Classification Search
CPC . H04W 40/22; H04W 88/06; H04W 56/0045;
H04W 56/001; H04W 74/0833; H04B 7/15528; H04B 7/026; H04B 7/04013; H04B 7/0421; H04L 45/24
See application file for complete search history.

(56) References Cited

U.S. PATENT DOCUMENTS

| | | | |
|---|---|---|---|
| 2021/0013619 A1* | 1/2021 | Alkhateeb | .......... H04B 7/04013 |
| 2021/0067237 A1 | 3/2021 | Sampath et al. | |
| 2021/0136838 A1 | 5/2021 | Khalid et al. | |

(Continued)

OTHER PUBLICATIONS

International Search Report and Written Opinion from corresponding International Application No. PCT/EP2022/062179, mailed on Jul. 28, 2022, 11 pages.

(Continued)

*Primary Examiner* — Dady Chery
(74) *Attorney, Agent, or Firm* — Tucker Ellis LLP

(57) ABSTRACT

According to a first aspect, examples provide a method of operating a first communication node (CN), wherein the first CN is configurable for exchanging, with a second CN on a radio channel, signals via a first propagation path and a second propagation path, wherein exchanging the signals via the first propagation path comprises exchanging the signals via a coverage enhancing device (CED), wherein the method comprises providing, to the CED, a message indicative of an activity pattern for establishing the first propagation path. Further examples provide a method of operating a CED, a first CN, a CED and a second CN.

16 Claims, 8 Drawing Sheets

(56) References Cited

U.S. PATENT DOCUMENTS

2022/0248356 A1 *   8/2022  Landis ................. H04B 7/0695

OTHER PUBLICATIONS

Office Action and Search Report from corresponding Swedish Application No. 2150583-9, mailed on Feb. 3, 2022, 10 pages.
Basar, Ertugrul et al., "Wireless Communications Through Reconfigurable Intelligent Surfaces", IEEE Access, Aug. 13, 2019, 21 pages.
Yang, Yifei et al., "IRS-Enhanced OFDM: Power Allocation and Passive Array Optimization", IEEE Globecom, Aug. 21, 2019, 6 pages.

* cited by examiner

100

AN    DL    UE

UL 120    150    110

220    210

AN    UE 221    223    213    211

CPU    CPU 222    212

IF    IF

MEM    MEM

IF    IF 225    226    216    215

224    214

250

430

434

434

434

433 IF

431 CPU    IF

432 MEM    436

1101

1111    1110    1121    1120    1131    1130

1102

1141    1140    1151    1150    1161    1160

1301

1311    1310    1321    1320    1331    1330

1302

1341    1340    1351    1350    1361    1360

1303

1371    1370    1381    1380    1391    1390

1301

1311    1310    1321    1320    1331    1330

1302

1341    1340    1351    1350    1361    1360

1303

1371    1370    1381    1380    1391    1390

ACTIVITY PATTERN OF COVERAGE ENHANCING DEVICES

TECHNICAL FIELD

Various examples generally relate to communicating between nodes using coverage enhancing devices.

BACKGROUND

In order to increase a coverage area for wireless communication, it is envisioned to use coverage enhancing devices (CEDs), particularly re-configurable relaying devices (RRD), more particularly, re-configurable reflective devices. Re-configurable reflective devices are sometimes also referred to as reflecting large intelligent surfaces (LISs). See, e.g., Sha Hu, Fredrik Rusek, and Ove Edfors. "Beyond massive MIMO The potential of data transmission with large intelligent surfaces." *IEEE Transactions on Signal Processing* 66.10 (2018) 2746-2758.

An RRD can be implemented by an array of antennas that can reflect incident electromagnetic waves/signals. The array of antennas can be semi-passive. Semi-passive can correspond to a scenario in which the antennas can impose a variable phase shift and typically provide no signal amplification. An input spatial direction from which incident signals on a radio channel are accepted and an output spatial direction into which the incident signals are reflected can be re-configured by changing a phase relationship between the antennas. Radio channel may refer to a radio channel specified by the 3GPP standard. In particular, the radio channel may refer to a physical radio channel. The radio channel may offer several time/frequency-resources for communication between different communication nodes of a communication system.

An access node (AN) may transmit signals to a wireless communication device (UE) via a CED. The CED may receive the incident signals from an input spatial direction and emit the incident signals in an output spatial direction to the UE. The AN may transmit the signals using a beam directed to the CED. In some scenarios, several CEDs may be used in parallel to transmit the signals from the AN to the UE. For example, a signal may be transmitted from the AN to the UE via a first propagation path and a second propagation path, wherein the first propagation path involves a reception and transmission of the signal by a first CED. The second propagation path may involve a reception and transmission of the signal by a second CED or may be a line-of-sight propagation path or may be a propagation path involving natural reflections.

While establishing the first propagation path in addition to the second propagation path may be beneficial for exchanging signals between the AN and the UE, the same first propagation path may interfere with the communication between the AN and further UEs.

SUMMARY

Accordingly, there may be a need for further improving communication between nodes using coverage enhancing devices (CEDs).

Said need is addressed with the subject matter of the independent claims. The dependent claims describe further advantageous examples.

According to a first aspect, examples provide a method of operating a first communication node (CN), wherein the first CN is configurable for exchanging, with a second CN on a radio channel, signals via a first propagation path and a second propagation path, wherein exchanging the signals via the first propagation path comprises exchanging the signals via a coverage enhancing device (CED), wherein the method comprises providing, to the CED, a message indicative of an activity pattern for establishing the first propagation path.

According to a second aspect, examples provide a method of operating a CED, the CED being reconfigurable for establishing a first propagation path for signals exchanged between a first communication node, CN, and a second CN, wherein the method comprises receiving, from the first CN, a message indicative of an activity pattern for establishing the first propagation path; and establishing the first propagation path in accordance with the activity pattern.

Further aspects provide examples of first CNs, second CNs and CED comprising control circuitry for performing respective methods.

DETAILED DESCRIPTION

Figures 1, 2:
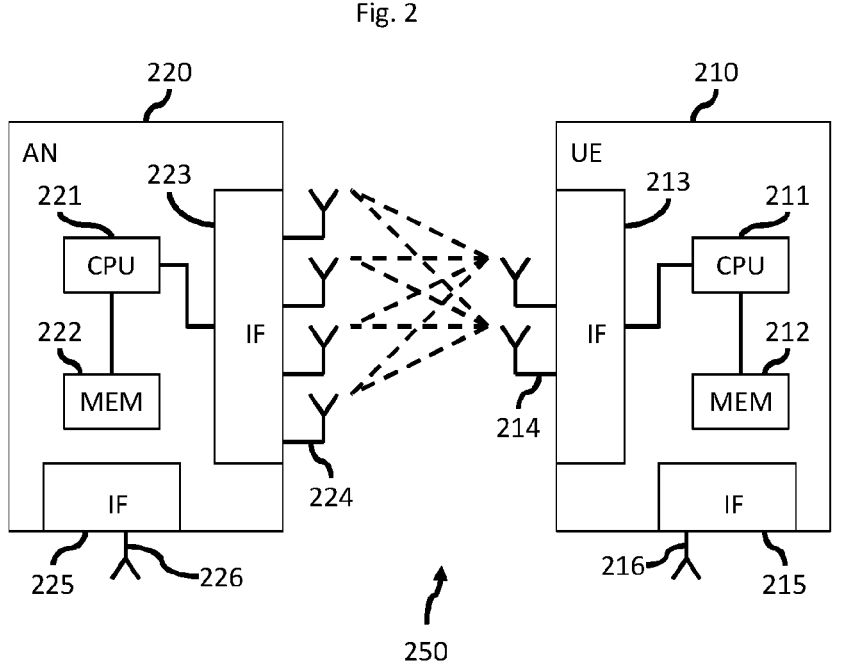
FIG. 1 schematically illustrates a communication system according to various examples.
FIG. 2 schematically illustrates details of the communication system according to the example of FIG. 1.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between nodes. A wireless communication system includes a transmitter node and one or more receiver nodes. In some examples, the wireless communication system can be implemented by a wireless communication network, e.g., a radio-access network (RAN) of a Third Generation Partnership Project (3GPP)-specified cellular network (NW). In such case, the transmitter node can be implemented by an access node (AN), in particular, a base station (BS), of the RAN, and the one or more receiver nodes can be implemented by terminals (also referred to as user equipment, UE). It would also be possible that the transmitter node is implemented by a UE and the one or more receiver nodes are implemented by an AN and/or further UEs. Hereinafter, for the sake of simplicity, various examples will be described with respect to an example implementation of the transmitter node by one or more ANs and the one or more receiver node by UEs—i.e., to downlink (DL) communication; but the respective techniques can be applied to other scenarios, e.g., uplink (UL) communication and/or sidelink communication.

Communication Via CEDs

According to various examples, the transmitter node can communicate with at least one of the receiver nodes via one or more CEDs.

The CEDs may include an antenna array. The CEDs may include a meta-material surface. In examples, the CEDs may include a reflective antenna array (RAA).

There are many schools-of-thought for how CEDs should be integrated into 3GPP-standardized RANs.

In an exemplary case, the NW operator has deployed the CEDs and is, therefore, in full control of the CEDs' operations. The UEs, on the other hand, may not be aware of the presence of any CED, at least initially, i.e., it is transparent to a UE whether it communicates directly with the AN or via the CEDs. The CEDs essentially function as a coverage-extender of the AN. The AN may have established control links with the CEDs.

According to another exemplary case, it might be a private user or some public entity that deploys the CEDs. Further, it may be that the UE, in this case, controls the CEDs' operations. The AN, on the other hand, may not be aware of the presence of any CED and, moreover, may not have control over it/them whatsoever. The UE may gain awareness of the presence of a CED by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the CED. It is also possible that the UE gains awareness of the presence of a CED using UWD (Ultra wideband) communication. Using UWB may offer better time resolution due to the wider bandwidth compared to other radio technologies.

The two exemplary cases described above are summarized in TAB. 1 below.

TABLE 1

| Scenarios for CED integration into cellular NW | | |
| --- | --- | --- |
| Scenario | Description | Explanation |
| A | AN-CED control link | AN controls the CED and/or can obtain information from the CED. A control link is established between the AN and the CED. |
| B | UE-CED control link | UE controls the CED and/or can obtain information from the CED. A control link is established between the UE and the CED. |

Hereinafter, techniques will be described which facilitate communication between a transmitter node—e.g., an AN—and one or more receiver nodes—e.g., one or more UEs—using a CED.

FIG. 1 schematically illustrates a communication system 100. The communication system 100 includes two nodes 110, 120 that are configured to communicate with each other via a radio channel 150. In the example of FIG. 1, the node 120 is implemented by an access node (AN) and the node 110 is implemented by a UE. The AN 120 can be part of a cellular NW (not shown in FIG. 1).

As a general rule, the techniques described herein could be used for various types of communication systems, e.g., also for peer-to-peer communication, etc. For the sake of simplicity, however, hereinafter, various techniques will be described in the context of a communication system that is implemented by an AN 120 of a cellular NW and a UE 110.

As illustrated in FIG. 1, there can be DL communication, as well as UL communication. Examples described herein particularly focus on the DL communication, but similar techniques may be applied to UL communication and/or sidelink communication. Input sweep and receive beam sweep may relate to DL communication and output sweep and transmit beam sweep may relate to UL communication.

FIG. 2 illustrates details with respect to the AN 220. The AN 220 includes control circuitry that is implemented by a processor 221 and a non-volatile memory 222. The processor 221 can load program code that is stored in the memory 222. The processor 221 can then execute the program code. Executing the program code causes the processor to perform techniques as described herein.

Moreover, FIG. 2 illustrates details with respect to the UE 210. The UE 210 includes control circuitry that is implemented by a processor 211 and a non-volatile memory 212. The processor 211 can load program code that is stored in the memory 212. The processor can execute the program code. Executing the program code causes the processor to perform techniques as described herein.

Further, FIG. 2 illustrates details with respect to communication between the AN 220 and the UE 210 on the radio channel 250. The AN 220 includes an interface 223 that can access and control multiple antennas 224. Likewise, the UE 210 includes an interface 213 that can access and control multiple antennas 214.

The UE 210 comprises a further interface 215 that can access and control at least one antenna 216 to transmit or receive a signal on an auxiliary radio channel different from the radio channel 250. Likewise, the AN 220 may comprise an additional interface 225 that can access and control at least one antenna 226 to transmit or receive a signal on the or a further auxiliary radio channel different from the radio channel. In general, the interface 225 may also be a wired interface. It may also be possible that the interface 225 is a wired or wireless optical interface. If wireless, the auxiliary radio channel may use in-band signaling or out-of-band signaling. The radio channel and the auxiliary radio channel may be offset in frequency. The auxiliary radio channel may be at least one of a Bluetooth radio channel, a WiFi channel, or an ultra-wideband radio channel. Methods for determining an angle of arrival may be provided by a communication protocol associated with the auxiliary radio channel. For example, methods for determining an angle of arrival may be provided by a Bluetooth radio channel.

While the scenario of FIG. 2 illustrates the antennas 224, 226 being coupled to the AN 220, as a general rule, it would be possible to employ transmit-receive points (TRPs) that are spaced apart from the AN 220.

The interfaces 213, 223 can each include one or more transmitter (TX) chains and one or more receiver (RX) chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 214, 224. Thereby, the AN 220 and the UE 210 can selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna 214, 224. Energy may also be focused to a specific point (or small sphere) at a specific direction and a specific distance of the transmitter. Thereby, a data stream may be directed in multiple spatial directions and/or to multiple specific points. The data streams transmitted on multiple beams can be independent, resulting in spatial multiplexing multi-antenna transmission; or dependent on each other, e.g., redundant, resulting in diversity multi-input multi-output (MIMO) transmission.

As a general rule, alternatively or additionally to such TX beams, it is possible to employ receive (RX) beams.

Figures 3, 4:
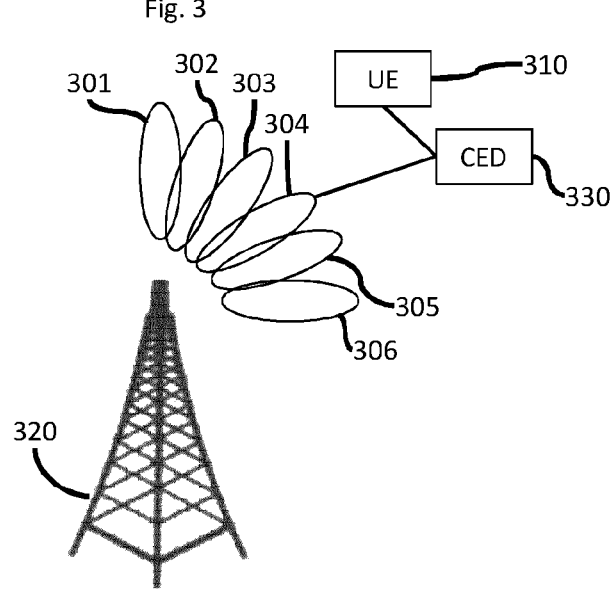
FIG. 3 schematically illustrates multiple downlink transmit beams used at a transmitter node of the communication system and further schematically illustrates a CED towards which one of the multiple transmit beams is directed according to various examples.
FIG. 4 schematically illustrates details with respect to a CED.

FIG. 3 illustrates DL TX beams 301-306 used by the AN 320. Here, the AN 320 activates the beams 301-306 on different resources (e.g., different time-frequency resources, and/or using orthogonal codes/precoding) such that the UE 310 can monitor for respective signals transmitted on the DL TX beams 301-306.

It is possible that the AN 320 transmits signals to the UE 310 via a CED 330. In the scenario of FIG. 3, the downlink transmit beam 304 is directed towards the CED 330. Thus, whenever the AN 320 transmits signals to the UE 310 using the downlink transmit beam 304—e.g., a respective block of a burst transmission—, a spatial filter is provided by the CED 330. The spatial filter is associated with a respective spatial direction into which the incident signals are then selectively reflected by the CED 330. Details with respect to the CED 330 are illustrated in connection with FIG. 4.

FIG. 4 illustrates aspects in connection with the CED 430. The CED 430 includes a phased array of antennas 434 that impose a configurable phase shift when reflecting incident signals. This defines respective spatial filters that may be associated with spatial directions into which the incident signals are reflected. The antennas 434 can be passive or semi-passive elements. The CED 430 thus provides coverage extension by reflection of radio-frequency (RF) signals. A translation to the baseband may not be required. This is different to, e.g., decode-and-forward repeater or regenerative functionality. The antennas 434 may induce an amplitude shift by attenuation. In some examples, the antennas 434 may provide forward amplification with or without translation of signals transmitted on the radio channel to the baseband. In some examples, the CEDs may be configurable to shift power from one polarization to the orthogonal polarization. The antennas 434 may amplify and forward the signals.

The CED 430 includes an antenna interface 433, which controls an array of antennas 434; a processor 431 can activate respective spatial filters one after another. The CED 430 further includes an interface 436 for receiving and/or transmitting signals on an auxiliary radio channel. The interface 436 may be a wireless interface. In some examples, the auxiliary radio channel may be replaced with a wired auxiliary channel and the interface 436 may be a wired interface. There is a memory 432 and the processor 431 can load program code from the non-volatile memory and execute the program code. Executing the program code causes the processor to perform techniques as described herein.

FIG. 4 is only one example implementation of a CED. Other implementations are conceivable. For example, a meta-material surface not including distinct antenna elements may be used. The meta-material can have a configurable refraction index. To provide a re-configurable refraction index, the meta-material may be made of repetitive tunable structures that have extensions smaller than the wavelength of the incident RF signals.

Transmitting Signals on a Radio Channel Via Two or More Coverage Enhancing Devices (CEDs)

Figure 5:
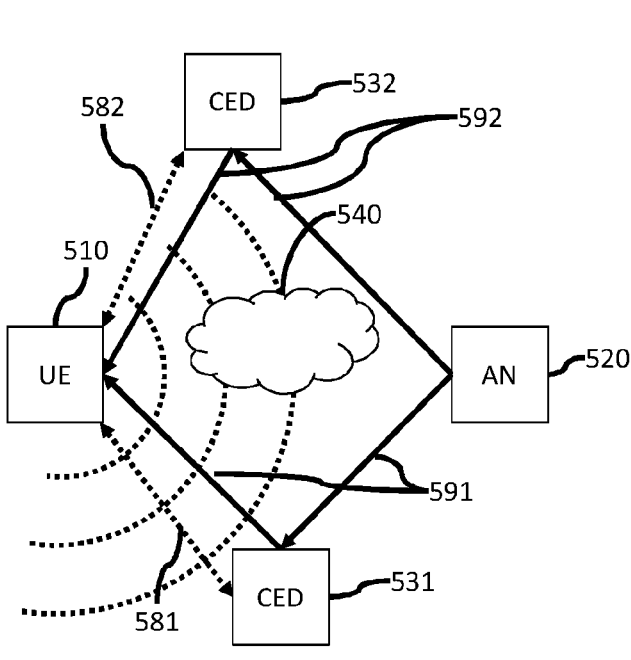
FIG. 5 schematically illustrates a scenario for using CEDs.

FIG. 5 illustrates an exemplary scenario B as described hereinbefore with reference to TAB. 1. A UE 510 is to communicate with an AN 520 over a radio channel via a first propagation path 591. The radio channel may be a 5G NR channel, in particular, a 5G NR channel in Frequency Range 2 or beyond. It is also conceivable that the radio channel is a 3GPP channel belonging to the frequency range from 7 to 24 GHz. An obstacle 540 between the UE 510 and the AN 520 may impede a direct line-of-sight communication between the UE 510 and the AN 520 on the radio channel.

A CED 531 may be employed to provide a physical propagation path 591 for the communication over the radio channel. In some examples, the position and orientation of the CED 531 with respect to the AN 520 may be fixed and known to the CED 531. As described hereinbefore, the CED 531 may be semi-passive and free of circuitry for encoding and decoding signals transmitted over the radio channel.

The CED 531 may provide multiple spatial filters, wherein each one of the multiple spatial filters is associated with a respective input spatial direction from which incident signals on a radio channel are accepted and with a respective output spatial direction into which the incident signals are reflected by the CED.

The CED 531 may perform an output sweep comprising changing the output spatial direction while using the given input spatial direction. In particular, the output sweep may be performed over signals transmitted by the AN 520. For example, the CED 531 can toggle through different output spatial directions by changing the phase relationships between the antenna elements.

The AN may send reference signals at certain times to the CED which emits the reference signals in different output spatial directions. During the beam sweep, the incident signals accepted by the CED are typically not emitted in an output spatial direction to the UE. In case the UE receives the reference signal, the reception properties determined by the UE may be used to re-configure the CED.

A further CED 532 may be employed to provide an additional (second) physical propagation path 592 for the communication over the radio channel. Both the first CED 531 and the second CED 532 may be controlled by the UE 510 via signaling 581 and 582, respectively.

In case of different propagation path lengths of the first propagation path and the second propagation path, the signals propagating via the first propagation path 591 and the second propagation path 592 may not necessarily interfere constructively and the improved coverage associated with the combined surfaces of the first CED 531 and the second CED 532 may not be obtained to the full extent. The signals propagating via the first propagation path 591 and the second propagation path 592 may also be considered as signal portions because they combine to form the signal at the receiving communication node. There may be at least some phase incoherence between the signal portions. FIG. 5 is an example of first communication node, CN, controlling the CEDs, wherein the first CN is receiving signals on the radio channel transmitted by a second communication node via the first propagation path and the second propagation path. In the example, the first CN is implemented by a UE and the second CN by an AN. However, it is also possible that the first CN is implemented by an AN and the second CN by a UE. In some scenarios, even both the first CN and the second CN may be implemented by UEs.

Figure 6:
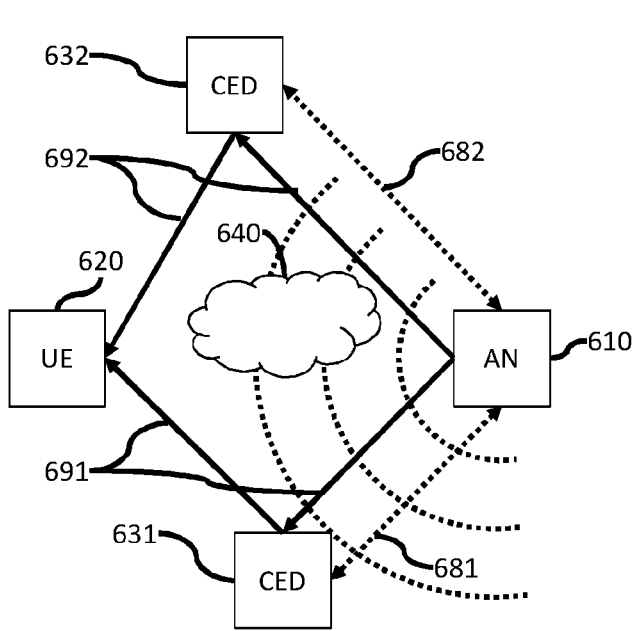
FIG. 6 schematically illustrates a scenario for using CEDs.

FIG. 6 illustrates an exemplary scenario A as described hereinbefore with reference to TAB. 1. An AN 610 is to communicate with a UE 620 over a radio channel via a first propagation path 691. The radio channel may be a 5G NR channel, in particular, a 5G NR channel in Frequency Range 2 or beyond. It is also conceivable that the radio channel is a 3GPP channel belonging to the frequency range from 7 to 24 GHz. An obstacle 640 between the UE 620 and the AN 610 may impede a direct line-of-sight communication between the UE 620 and the AN 610 over the radio channel.

A first CED 631 may be employed to provide a physical propagation path 691 for the communication over the radio channel. In some examples, the position and orientation of the first CED 631 with respect to the AN 610 may be fixed and known to the first CED 631. As described hereinbefore, the CED 631 may be semi-passive and free of circuitry for encoding and decoding signals transmitted over the radio channel.

The CED 631 may provide multiple spatial filters, wherein each one of the multiple spatial filters is associated with a respective input spatial direction from which incident signals on a radio channel are accepted and with a respective output spatial direction into which the incident signals are reflected by the first CED 631.

The CED 631 may perform an output sweep comprising changing the output spatial direction while using the given input spatial direction. In particular, the output sweep may be performed over signals transmitted by the AN 610. For example, the CED 631 can toggle through different output spatial directions by changing the phase relationships between the antenna elements.

The AN may send reference signals at certain times to the CED which emits the reference signals in different output spatial directions. During the beam sweep, the incident signals accepted by the CED are typically not emitted in an output spatial direction toward the UE. In case the UE receives the reference signal, the reception properties determined by the UE may be fed back to the AN and used to re-configure the CED.

A further CED 632 may be employed to provide an additional (second) physical propagation path 692 for the communication over the radio channel. Both the first CED 631 and the second CED 632 may be controlled by the AN 610 via signaling 681 and 682, respectively.

In case of different propagation path lengths of the first propagation path and the second propagation path, the signal portions propagating via the first propagation path 691 and the second propagation path 692 may not necessarily interfere constructively and the improved coverage associated with the combined surfaces of the first CED 631 and the second CED 632 may not be obtained to the full extent. There may be at least some phase incoherence between the signal portions. FIG. 6 is an example of first communication node, CN, controlling the CEDs, wherein the first CN is transmitting signals on the radio channel transmitted by a second communication node via the first propagation path and the second propagation path. In the example, the first CN is implemented by an AN and the second CN by a UE. However, it is also possible that the first CN is implemented by a UE and the second CN by an AN. In some scenarios, even both the first CN and the second CN may be implemented by UEs.

Multipath Transmission of OFDM Symbols Involving CEDs

Figure 7:
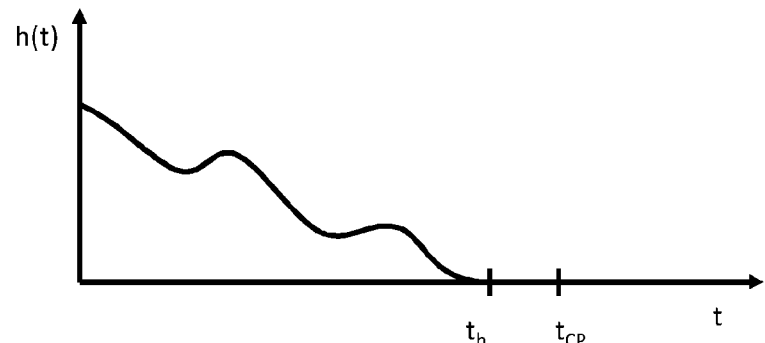
FIG. 7 schematically illustrates a channel impulse response.

A first CN may transmit a signal s(t) to a second CN. In the absence of noise, the second CN may receive the signal r(t)=s(t)*h(t), wherein the operator * denotes the convolution and h(t) corresponds to the channel impulse response of the physical channel between the first CN and the second CN. If the transmitted signal s(t) corresponds to an OFDM symbol comprising a cyclic prefix, the duration $t_h$ of h(t) should be shorter than the duration $t_{cp}$ of the cyclic prefix of the OFDM symbol as shown in FIG. 7.

Figure 8:
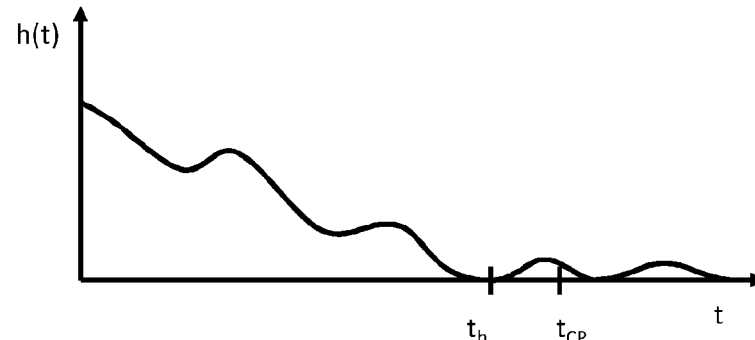
FIG. 8 schematically illustrates a channel impulse response.

In practice, the condition h(t)=0 for $t>t_{cp}$ is often only approximately fulfilled. As shown in FIG. 8, h(t) may still have small, almost negligible values h(t)=>0 for $t>t_{cp}$. However, these negligible values do not significantly degrade the system efficiency, so can be ignored.

Figure 9:
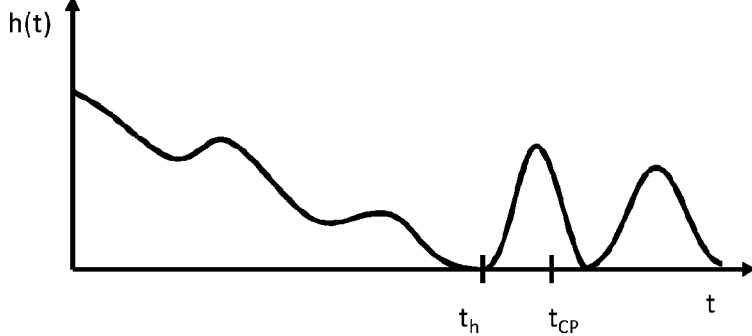
FIG. 9 schematically illustrates a channel impulse response.

In contrast, where a system includes a CED, for example, in the first propagation path, the CED may amplify h(t) for $t>t_{cp}$ leading to h(t)>as shown in FIG. 9. Hence, the assumption h(t)≈0 for $t>t_{cp}$ may no longer be valid and orthogonality among subcarriers used for transmitting the OFDM symbols may be lost. This may imply a significant degradation of the transmission performance.

Figures 10, 11, 12, 13, 14, 15:
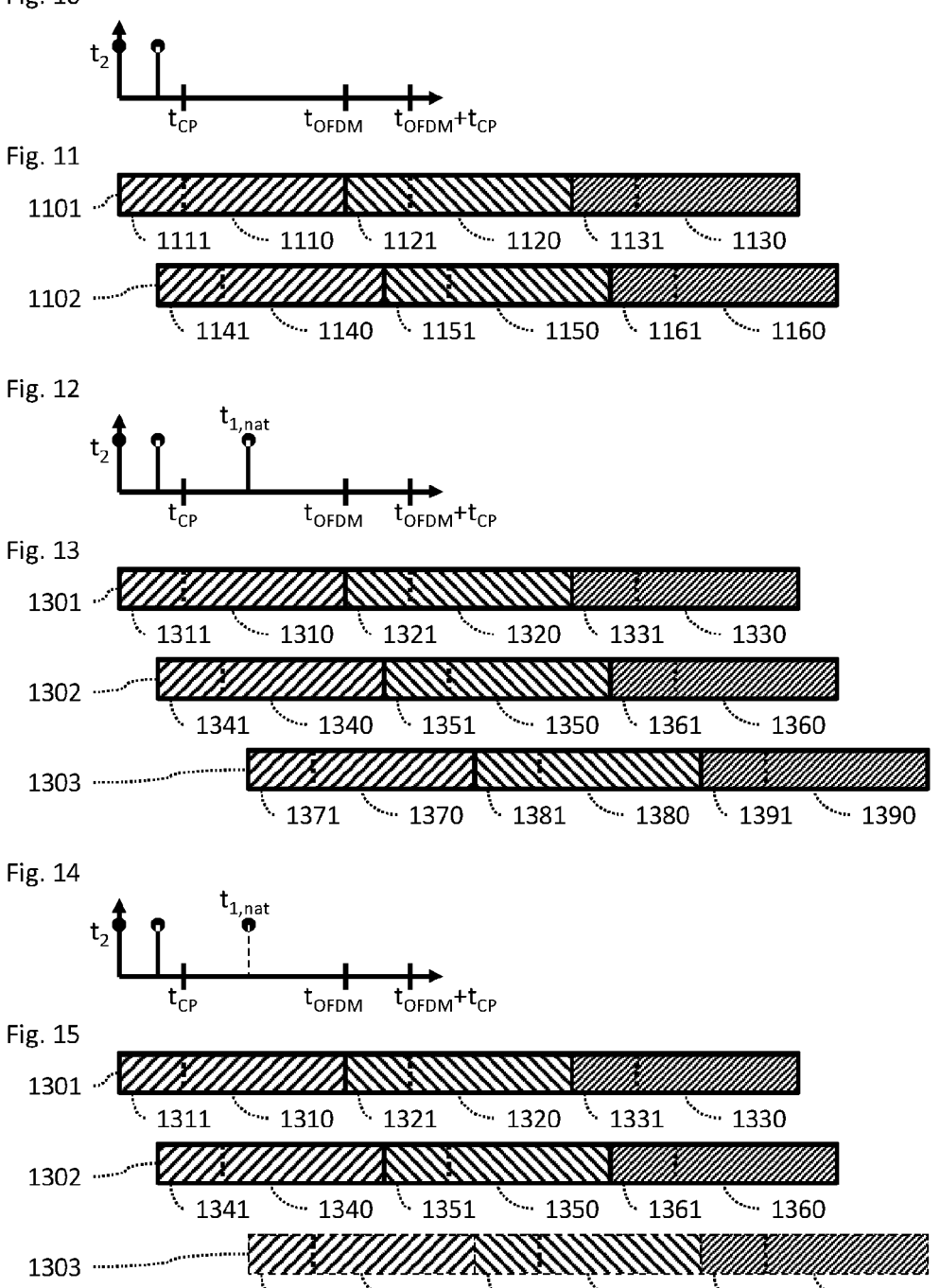
FIG. 10 schematically illustrates a two-tap channel.
FIG. 11 schematically illustrates portions of a received noise-free signal of the two-tap channel of FIG. 10.
FIG. 12 schematically illustrates a three-tap channel.
FIG. 13 schematically illustrates portions of a received noise-free signal of the three-tap channel of FIG. 12.
FIG. 14 schematically illustrates a two-tap channel resulting from a silent CED.
FIG. 15 schematically illustrates portions of a received noise-free signal of the two-tap channel of FIG. 14.

FIG. 10 shows a two-tap channel, more particularly the impulse response of the channel, between a first CN and a second CN that would emerge in the absence of a propagation path involving a CED. A two-tap channel is used to simplify the illustration, but similar considerations apply to channels comprising more taps. More generally, a channel impulse response can be represented by a discrete number of propagation delays, i.e., the channel taps, at which the energy of the channel is concentrated. In the example of FIG. 10, all taps of the channel are within $t_{cp}$.

FIG. 11 illustrates the received noise-free signal at the second CN. Since there is a two-tap channel, the received signal corresponds to an addition of the transmitted signal 1101 from the first CN comprising OFDM symbols 1110, 1120, 1130, wherein each OFDM symbol 1110, 1120, 1130 comprises a cyclic prefix 1111, 1121, 1131, and a delayed version 1102 thereof comprising OFDM symbols 1140, 1150, 1160. The delayed version of the OFDM symbols 1140, 1150, 1160 are delayed, for example, due to having arrived at the second CN along a different, longer propagation path than those of the non-delayed OFDM symbols 1110, 1120, 1130. As shown in FIG. 11, the OFDM symbols 1110, 1120, 1130 and 1140, 1150, 1160 are aligned, i.e., the OFDM symbol 1140, 1150, 1160 start within the duration $t_{cp}$ of the respective cyclic prefix of the OFDM symbols 1110, 1120, 1130.

FIG. 12 shows the channel between the first CN and the second CN that emerges when a first propagation path via a CED is introduced and the CED amplifies a portion of the signal with a large delay $t_{1,natural}$. $t_{1,natural}$ is solely a consequence of the propagation path length of the first propagation path. Due to the first propagation path, a three-tap channel emerges. Accordingly, the received signal corresponds to an addition of the transmitted signal 1301 comprising OFDM symbols 1310, 1320, 1330 with two delayed versions 1302, 1303 thereof comprising OFDM symbols 1340, 1350, 1360 and 1370, 1380, 1390, respectively, as shown in FIG. 13. The version delayed in view of the first propagation path arrives at the second CN with a delay exceeding $t_{cp}$. Hence, orthogonality among subcarriers is lost and the OFDM system breaks down.

FIG. 14 shows an example of the channel between the first CN and the second CN that emerges if the CED is silent, i.e. does not transmit incident signals.

FIG. 15 illustrates the received noise-free signal at the second CN. The received signal corresponds to an addition of the transmitted signal 1501 comprising OFDM symbols 1510, 1520, 1530 only with the delayed versions 1502. The effect of the silent CED is that orthogonality among subcarriers is maintained.

Optimizing First Propagation Path Provisioning

As explained above, establishing an additional propagation path via a CED may sometimes lead to a loss of orthogonality among subcarriers. Thus, examples provide a method of operating a first CN, wherein the first CN is configurable for exchanging, with a second CN on a radio channel, signals via a first propagation path and a second propagation path, wherein exchanging the signals via the first propagation path comprises exchanging the signals via a CED, wherein the method comprises providing, to the CED, a message indicative of an activity pattern for establishing the first propagation path. The first CN may be configured for controlling the CED. The first CN may use RRC signaling for providing the activity pattern to the CED. Exchanging signals may comprise to transmitting signals to the second CN and/or receiving signals from the second CN.

The activity pattern may inform the CED when the CED should actively relay signals from the first CN to the second CN (or vice versa) and when it should remain silent. Thus, the activity pattern indicates when the first propagation path is to be established.

The activity pattern may be periodic, semi-persistent or aperiodic. The message indicative of the activity pattern may indicate a well-defined point in time when the activity pattern starts to be valid. For example, the activity pattern may be aligned with a next radio frame boundary after the transmission of the message, or an offset thereof. The message may further indicate the periodicity of a periodic activity pattern.

The first CN may provide the message indicative of the activity pattern also to a third CN node. For example, the first CN may be implemented as a first AN and the third CN may be implemented as a second AN. In case the second AN has knowledge of the activity pattern, the risk of signal interferences in neighboring cells may be avoided.

The first CN may obtain, from the CED, a message indicative of a capability of the CED to establish the first propagation path according to an activity pattern. In some examples, the activity pattern depends on the message indicative of the capability of the CED to establish the first propagation path.

In some examples, the signals exchanged between the first CN and the second CN are OFDM symbols, in particular OFDM symbols as specified for NR communication in 3GPP. In such scenarios, the granularity of the activity pattern may correspond to OFDM symbols or OFDM slots.

As an example, the activity pattern may have the form "11110000", wherein "1" indicates that the first propagation path is to be established by the CED and "0" indicates that the first propagation path is not to be established, i.e., the CED should remain silent.

The first CN may communicate with the second CN according to a transmission direction pattern. In examples, the transmission direction pattern may correspond to a TDD (Time Division Duplex) UL-DL (Uplink-Downlink) configuration. In an example, the transmission direction pattern may have the form "DDFU", wherein D refers to a downlink slot, U to an uplink slot, and F to a flexible slot.

The first CN may provide a message indicative of the transmission direction pattern to the CED. The CED may establish the first propagation path taking into account the activity pattern or both the activity pattern and the transmission direction pattern.

Assuming the activity pattern and the transmission direction pattern proposed above, the first CN and the second CN may exchange data according to the pattern "DDFUDDFUDDF . . . " and the CED may use the following configuration "DDFU . . . DDFU . . . " for establishing the first propagation path, where dashes represent symbols for which the CED remains silent (i.e., does not transmit the received symbols).

Figure 16:
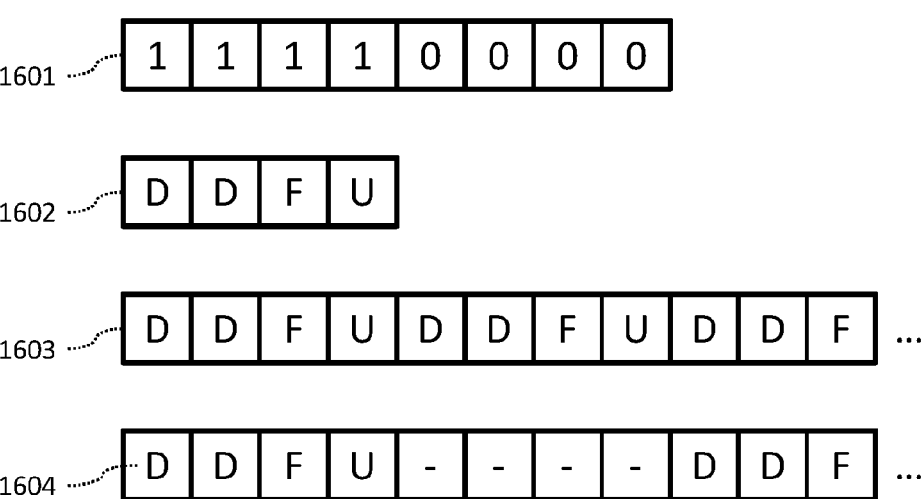
FIG. 16 schematically illustrates an activity pattern, a transmission direction pattern as well as corresponding configurations of a first CN, a second CN, and a CED.

FIG. 16 is a further illustration of the activity pattern 1601, the transmission direction pattern 1602, the resulting configuration 1603 of the first and second for exchanging signals, and the resulting configuration 1604 of the CED for transmitting signals.

In the example, the first CN may be considered being configured according to an uplink/downlink TDD configuration, e.g., via a TDD-UL-DL-ConfigCommon RRC message as specified by 3GPP, having a period of four OFDM slots, of which the first two slots are downlink (D) slots, the last slot is an uplink (U) slot, and the rest, i.e., one slot, is a flexible (F) slot. The flexible slot may consist of a number of DL symbols, at the beginning, a number of UL symbols, at the end, and the rest are guard (G) symbols to switch from DL to UL. A more detailed structure information of the F slot may be provided by the parameter TDD-UL-DL-Config-Common as specified by 3GPP. The UL/DL TDD pattern, which may be configured by the network, may be followed by the first CN, the second CN and the CED. In particular, the CED may use a different configuration for establishing a first propagation path from the first CN to the second CN than a configuration for establishing a first propagation path from the second CN to the first CN.

On top of that, the first CN may provide an activity pattern to the CED. In the example, the activity pattern may have a periodicity of eight OFMD slots. The CED is configured to be active during the first four OFDM slots and inactive during the last four OFDM slots. Hence, in effect, the CED may see the UL/DL TDD pattern "DDFU . . . DDFU . . . ", wherein dashes indicate that the CED is silent, i.e. is not transmitting.

The first CN (e.g., an AN) may schedule traffic to several second CNs (e.g., several UEs) depending on whether it is advantageous for each second CN to have an active repeater or not. For example, this might depend on whether or not the delay spread of the propagation channel with an active CED exceeds the cyclic prefix length. Hence, the ratio of active/inactive slots in the activity pattern may be dynamically adapting depending on estimates of the current delay spreads of propagation channels.

The behavior of the CED may differ in the UL and the DL direction, e.g., if a link is UL limited. Thus, a CED may be configured to relay UL signals only, acting as an UL-only CED. Similarly, a CED may also be configured to relay DL signals only, thus acting as a DL-only CED.

To avoid latency when a second CN would require a first propagation path via the CED in addition to a (natural) second propagation path and the CED is current undergoing a period of silence according to a configured activity pattern, the CED may be configured with probing occasions and/or may be active during RACH occasions.

Figure 17:
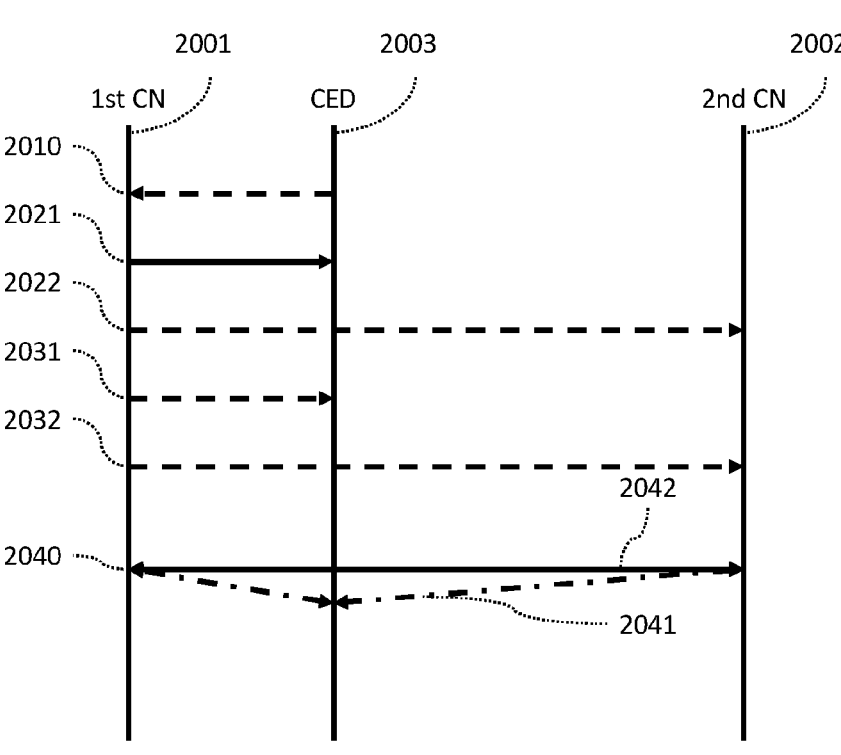
FIG. 17 is a signaling diagram.

FIG. 17 is a signaling diagram illustrating signaling in a communication system comprising a first CN 2001, a second CN 2002 and a CED 2003. The first CN 2001 may exchange signals with the second CN 2002 on a radio channel, via a first propagation path and a second propagation path.

Transmitting the signals via the first propagation path comprises transmitting the signals via the CED 2003.

In examples, the CED 2003 may be reconfigurable to provide multiple spatial filterings, each one of the multiple spatial filterings being associated with a respective input spatial direction from which incident signals on a radio channel are accepted and with a respective output spatial direction into which the incident signals are transmitted by the CED 2003.

The first CN 2001 may obtain, from the CED 2003, a message 2010 indicative of a capability of the first CED 2003 to establish the first propagation path according to an activity pattern.

The CED 2003 obtains, from the first CN 2001, a message 2021 indicative of an activity pattern for establishing the first propagation path. The first CN 2001 may further provide a message 2022 indicative of the activity pattern to the second CN 2002. The first CN 2001 may select the activity pattern based on information on the propagation times associated with the first propagation path and the second propagation path. In some examples, the first CN 2001 may receive information about the delays at the second CN 2002 from the second CN 2002. In some scenarios, the first CN 2021 may know the locations of itself, the CED and the second CN and be able to calculate whether signals sent via the CED will cause any problems, such as the interference described above with respect to FIGS. 12 and 13. In further scenarios, the activity pattern may be selected taking broadcast signals, i.e. signals addressed to several CNs into account. When sending broadcast signals, the risk that a CED causes undesired interferences may be particularly high. Thus, the activity pattern may prescribe that the CED should be silent in times of broadcast signaling. In general, there are many ways the first CN could obtain the information for selecting the activity pattern.

Further, the first CN 2001 may provide, to the CED 2003, a message 2031 indicative of a transmission direction pattern. In the alternative or in addition, the second CN 2002 may obtain, from the CN 2001, a message 2032 indicative of the transmission direction pattern.

The first CN 2001 and the second CN 2002 exchange signals 2040 on a radio channel over the first propagation path 2041 and a second propagation path 2042. The CED activates or deactivates the first propagation path 2041 according to the activity pattern. In examples, the first CN 2001 and the second CN 2002 may exchange OFDM symbols 2040, in particular OFDM symbols carrying payload data, via the first propagation path 2041 and the second propagation path 2042.

Figure 18:
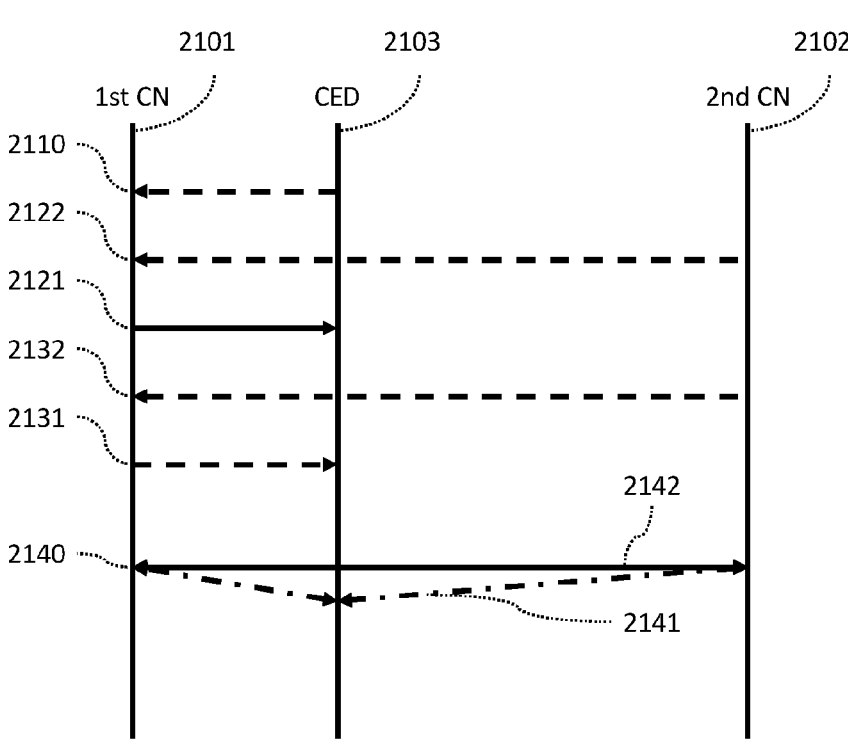
FIG. 18 is a signaling diagram.

FIG. 18 is a further signaling diagram illustrating signaling in a communication system comprising a first CN 2101, a second CN 2102 and a CED 2103. The second CN 2102 is to exchange signals, in particular OFDM symbols, with the first CN 2101. In contrast to the scenario of FIG. 17, the first CN 2101 obtains the message indicative of the activity pattern and/or the message indicative of the transmission direction pattern from the second CN 2102.

The first CN 2101 may obtain, from the CED 2103, a message 2110 indicative of a capability of the first CED 2103 to establish the first propagation path according to an activity pattern. The first CN 2101 may further obtain a message 2122 indicative of the activity pattern from the second CN 2102. The CED 2103 obtains, from the first CN 2101, a message 2121 indicative of an activity pattern for establishing the first propagation path. The second CN 2102 may select the activity pattern based on information on the propagation times associated with the first propagation path and the second propagation path. In some examples, the second CN 2102 may use information about the observed delays. In some scenarios, the second CN 2102 may know the locations of itself, the CED and the first CN and be able to calculate whether signals sent via the CED will cause any problems, such as the interference described above with respect to FIGS. 12 and 13. In further scenarios, the activity pattern may be selected taking broadcast signals, i.e. signals addressed to several CNs into account. During transmission of broadcast signals, the risk that a CED causes undesired interferences may be particularly high. Thus, the activity pattern may prescribe that the CED should be silent in times of broadcast signaling. In general, there are many ways the second CN could obtain the information for selecting the activity pattern.

Further, the second CN 2102 may provide, to the first CN 2101, a message 2132 indicative of a transmission direction pattern. The CN 2101 may provide, to the CED 2103, a message 2131 indicative of the transmission direction pattern. The first CN 2101 and the second CN 2102 exchange signals 2140 on a radio channel over a first propagation path 2141 and the second propagation path 2142. The CED activates or deactivates the first propagation path 2141 according to the activity pattern. In examples, the first CN 2101 and the second CN 2102 may exchange OFDM symbols 2140, in particular OFDM symbols carrying payload data, via the first propagation path 2141 and the second propagation path 2142.

The invention claimed is:

1. A method of operating a first communication node (CN) wherein the first CN is configurable for exchanging, with a second CN on a radio channel, signals via a first propagation path and a second propagation path, wherein exchanging the signals via the first propagation path comprises exchanging the signals via a coverage enhancing device (CED) wherein the method comprises:

providing, to the CED, a message indicative of an activity pattern for establishing the first propagation path, wherein the signals exchanged with the second CN comprise OFDM symbols, and wherein a granularity of the activity pattern corresponds to OFDM symbols or OFDM slots;

providing, to the CED, a message indicative of a transmission direction pattern, wherein the transmission direction pattern is TDD (Time Division Duplex) UL-DL (Uplink-Downlink) configuration, and wherein the first propagation path is established by taking into account both the activity pattern and the transmission direction pattern.

2. The method of operating the first CN of claim 1, wherein the activity pattern determines whether the CED is to actively transmit signals between the first CN and the second CN or whether the CED is to be inactive and not to transmit signals between the first CN and the second CN.

3. The method of operating the first CN of claim 1, wherein the activity pattern is periodic.

4. The method of operating the first CN of claim 1, wherein the activity pattern is semi-persistent.

5. The method of operating the first CN of claim 1, wherein the activity pattern is aperiodic.

6. The method of operating the first CN of claim 1, wherein the method further comprises:

providing, to the second CN or a third CN, a message indicative of the activity pattern.

7. The method of operating the first CN of claim 6, wherein the activity pattern is synchronized with the transmission direction pattern.

8. The method of operating the first CN of claim 1, wherein the method further comprises:

exchanging, with the second CN on the radio channel, signals according to the transmission direction pattern, in particular the transmission direction pattern as a function of time.

9. The method of operating the first CN of claim 1, wherein the method further comprises:

obtaining, from the CED, a message indicative of a capability of the CED to establish the first propagation path according to an activity pattern.

10. The method of operating the first CN of claim 9, wherein the activity pattern depends on the message indicative of the capability of the CED to establish the first propagation path.

11. The method of operating the first CN of claim 1, wherein the activity pattern prescribes establishing the first propagation path during a RACH occasion.

12. A first communication node (CN) wherein the first CN comprises control circuitry configured for performing the method of claim 1.

13. The method of operating the first CN of claim 1, wherein the CED is controlled by the first CN via signaling between the first CN and the CED, the signaling between the first CN and the CED being separate from the first propagation path.

14. A method of operating a coverage enhancing device (CED) the CED being reconfigurable for establishing a first propagation path for signals exchanged between a first communication node (CN) and a second CN, wherein the method comprises:

receiving, from the first CN, a message indicative of an activity pattern for establishing the first propagation path;

establishing the first propagation path in accordance with the activity pattern, wherein the signals exchanged with the second CN comprise OFDM symbols, and wherein a granularity of the activity pattern corresponds to OFDM symbols or OFDM slots; and receiving, from the first CN, a message indicative of a transmission direction pattern, wherein the transmission direction pattern is TDD (Time Division Duplex) UL-DL (Uplink-Downlink) configuration, and wherein the first propagation path is established by taking into account both the activity pattern and the transmission direction pattern.

15. A coverage enhancing device (CED) wherein the CED comprises control circuitry configured for performing the method of claim 14.

16. The method of operating the CED of claim 14, wherein the CED is controlled by the first CN via signaling between the first CN and the CED, the signaling between the first CN and the CED being separate from the first propagation path.

* * * * *